US008634657B2

(12) United States Patent
Sakamoto

(10) Patent No.: US 8,634,657 B2
(45) Date of Patent: Jan. 21, 2014

(54) IMAGE PROCESSING DEVICE AND COMPUTER-PROGRAM PRODUCT OF IMAGE EVALUATION

(75) Inventor: Koichi Sakamoto, Asaka (JP)

(73) Assignee: Nikon Corporation, Tokyo (JP)

(*) Notice: Subject to any disclaimer, the term of this patent is extended or adjusted under 35 U.S.C. 154(b) by 142 days.

(21) Appl. No.: 13/074,426

(22) Filed: Mar. 29, 2011

(65) Prior Publication Data

US 2012/0082389 A1    Apr. 5, 2012

(30) Foreign Application Priority Data

Mar. 30, 2010   (JP) ................................. 2010-077746
Mar. 3, 2011    (JP) ................................. 2011-046188

(51) Int. Cl.
*G06K 9/62*    (2006.01)

(52) U.S. Cl.
USPC ........... 382/209; 382/190; 382/192; 382/201; 382/226; 382/227

(58) Field of Classification Search
USPC .......... 382/224, 190, 192, 201, 209, 226, 227
See application file for complete search history.

(56) References Cited

U.S. PATENT DOCUMENTS

| | | | | |
|---|---|---|---|---|
| 8,078,623 | B2* | 12/2011 | Chou et al. | 707/737 |
| 8,208,732 | B2* | 6/2012 | Nakamura | 382/190 |
| 8,285,008 | B2* | 10/2012 | Ishii | 382/118 |
| 2004/0258304 | A1* | 12/2004 | Shiota et al. | 382/170 |
| 2009/0219415 | A1* | 9/2009 | Matsunaga et al. | 348/239 |
| 2012/0082389 | A1* | 4/2012 | Sakamoto | 382/224 |

FOREIGN PATENT DOCUMENTS

| JP | 2001320621 A | * | 11/2001 |
|---|---|---|---|
| JP | A-2001-320621 | | 11/2001 |
| JP | 2006311340 A | * | 11/2006 |
| JP | A-2006-311340 | | 11/2006 |
| JP | 2009253936 A | * | 10/2009 |
| JP | A-2009-253936 | | 10/2009 |

OTHER PUBLICATIONS

Jan. 24, 2012 Office Action issued in Japanese Patent Application No. 2011-046188 (with translation).
Dec. 11, 2012 Office Action issued in Japanese Application No. 2012-113344 (with translation).

\* cited by examiner

*Primary Examiner* — Jayesh A Patel
*Assistant Examiner* — Iman K Kholdebarin
(74) *Attorney, Agent, or Firm* — Oliff & Berridge, PLC

(57) ABSTRACT

An image processing device includes: a first arithmetic operation unit that individually calculates an evaluation value based upon first factors, in correspondence to each of a plurality of images included in an image batch input thereto; an exclusion unit that executes exclusion processing based upon calculation results provided by the first arithmetic operation unit so as to exclude an image, the calculation results for which satisfy a predetermined condition, from the image batch; a second arithmetic operation unit that individually calculates an evaluation value based upon second factors, which include a factor different from the first factors, in correspondence to each image in the image batch having undergone the exclusion processing; and an evaluation processing unit that ranks individual images in the image batch having undergone the exclusion processing based upon calculation results provided by the second arithmetic operation unit.

33 Claims, 10 Drawing Sheets

FIG.4

| | | CASE_PF | CASE_MV | UNWANTED IMAGE EVALUATION | | | | UNWANTED/OPTIMAL IMAGE EVALUATION | | | OPTIMAL IMAGE EVALUATION MULTIPLE | | |
|---|---|---|---|---|---|---|---|---|---|---|---|---|---|
| | | | | 41 DETECTED PROXIMITY AMONG A PLURALITY OF PEOPLE | 42 DETECTED UNNECESSARY OBJECT IN FACE AREA | 43 DETECTED EYE CLOSURE | 44 DETECTED FRAME OUT | 45 AF-DETECTED FACE AREA BLUR/SHARPNESS | 46 OVERALL LUMINANCE HISTOGRAM | 47 FACE AREA | 48 SMILE FACTOR | 49 SUBJECT SIZE | 50 COMPOSITION OPTIMALITY |
| CASE A | PERSON | 1 | 1 | ON | ON | ON | ON | ON | ON | ON | ON | OFF | ON |
| CASE B | DYNAMIC OBJECT-ANGLE OF FIELD | 0 | 1 | OFF | OFF | OFF | ON | ON | ON | OFF | OFF | ON | ON |
| CASE C | COMPLETELY STILL IMAGE | 0 | 0 | OFF | OFF | OFF | OFF | ON | ON | OFF | OFF | OFF | OFF |

FIG.5A
FIG.5B
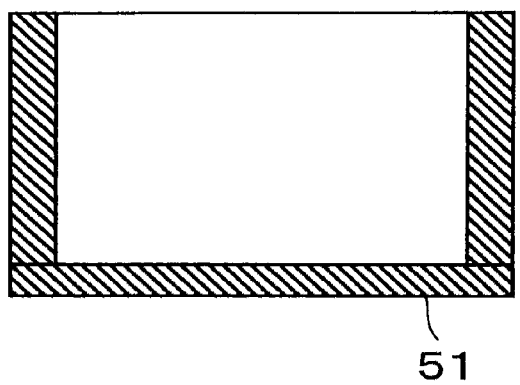
51
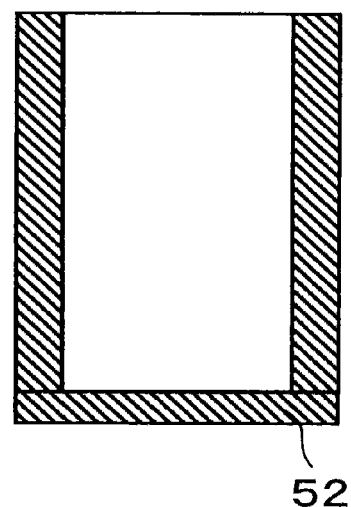
52

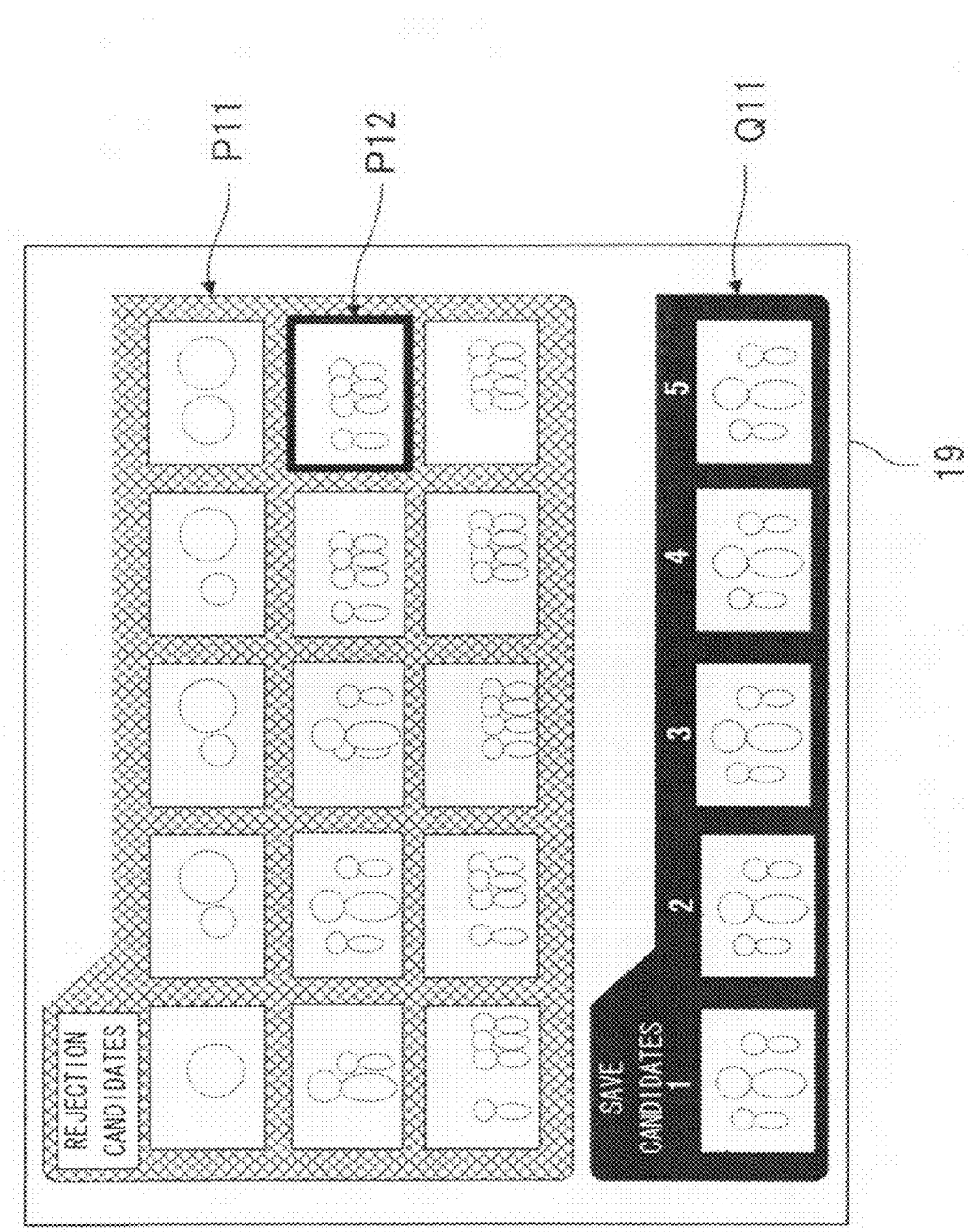

//># IMAGE PROCESSING DEVICE AND COMPUTER-PROGRAM PRODUCT OF IMAGE EVALUATION

INCORPORATION BY REFERENCE

The disclosures of the following priority applications are herein incorporated by reference: Japanese Patent Application No. 2010-077746 filed Mar. 30, 2010; and Japanese Patent Application No. 2011-046188 filed Mar. 3, 2011

BACKGROUND OF THE INVENTION

1. Field of the Invention

The present invention relates to an image processing device and a computer-program product that provides an image evaluation program.

2. Description of Related Art

There is a camera known in the related art that selects a best shot image among a plurality of images (see Japanese Laid Open Patent Publication No. 2006-311340). In the related art, an image that is free of blurring is selected and then, an image obtained through the optimal exposure is selected based upon the histogram related to the blur-free image.

SUMMARY OF THE INVENTION

There is an issue yet to be addressed in the related art in that since a best shot candidate image is selected by making a decision as to whether or not image blurring manifests for all the images, the processing is bound to be time-consuming. In other words, all the images undergo the decision-making process executed based upon an optimization factor (i.e., no image blur).

According to the 1st aspect of the present invention, an image processing device, comprises: a first arithmetic operation unit that individually calculates an evaluation value based upon first factors, in correspondence to each of a plurality of images included in an image batch input thereto; an exclusion unit that executes exclusion processing based upon calculation results provided by the first arithmetic operation unit so as to exclude an image, the calculation results for which satisfy a predetermined condition, from the image batch; a second arithmetic operation unit that individually calculates an evaluation value based upon second factors, which include a factor different from the first factors, in correspondence to each image in the image batch having undergone the exclusion processing; and an evaluation processing unit that ranks individual images in the image batch having undergone the exclusion processing based upon calculation results provided by the second arithmetic operation unit.

According to the 2nd aspect of the present invention, in the image processing device according to the 1st aspect, it is preferred that the image batch includes a plurality of images obtained through a continuous shooting operation.

According to the 3rd aspect of the present invention, in the image processing device according to the 1st aspect, it is preferred that the first arithmetic operation unit alters contents of the first factors in correspondence to a photographic scene when capturing the image batch.

According to the 4th aspect of the present invention, in the image processing device according to the 3rd aspect, it is preferred that the first arithmetic operation unit alters the contents of the first factors in correspondence to at least either whether or not the' image batch includes a dynamic subject image or whether or not there is a person in the subject image.

According to the 5th aspect of the present invention, in the image processing device according to the 1st aspect, it is preferred that the exclusion unit excludes at least half of the images in the image batch based upon the calculation results provided by the first arithmetic operation unit.

According to the 6th aspect of the present invention, in the image processing device according to the 1st aspect, it is preferred that some of the first factors and some of the second factors overlap.

According to the 7th aspect of the present invention, in the image processing device according to the 6th aspect, it is preferred that the overlapping factors include at least either sharpness information in a predetermined area of each of the images making up the image batch or luminance distribution information over an entire range of each of the images.

According to the 8th aspect of the present invention, in the image processing device according to the 1st aspect, it is preferred that the second factors include at least one of a factor related to a facial expression on a person captured in a subject image included in the image batch, a factor related to an areal size of a face of a person and a factor related to blurring manifesting in the subject image.

According to the 9th aspect of the present invention, in the image processing device according to the 1st aspect, it is preferred that the image processing device further comprises a display control unit that brings up on display at a display device images to be excluded by the exclusion unit.

According to the 10th aspect of the present invention, in the image processing device according to the 9th aspect, it is preferred that the image processing device further comprises a control unit that controls the exclusion unit so as not to exclude a specific image among the images brought up on display at the display device by the display control unit.

According to the 11th aspect of the present invention, in the image processing device according to the 1st aspect, it is preferred that the image processing device further comprises a factor adding unit that adds a new factor to at least either the first factors or the second factors.

According to the 12th aspect of the present invention, in the image processing device according to the 5th aspect, it is preferred that: the exclusion unit excludes a predetermined number of images from the image batch; and the predetermined number can be altered.

According to the 13th aspect of the present invention, in the image processing device according to the 12th aspect, it is preferred that: the exclusion unit does not execute the exclusion processing if the predetermined number of images cannot be excluded based upon the calculation results provided by the first arithmetic operation units; when the exclusion unit does not execute the exclusion processing, the second arithmetic operation unit individually calculates the evaluation value based upon the second factors in correspondence to each of all the images in the image batch having been input; and the evaluation processing unit ranks the individual images in the entire image batch having been input based upon the calculation results provided by the second arithmetic operation unit.

According to the 14th aspect of the present invention, in the image processing device according to the 12th aspect, it is preferred that: the exclusion unit excludes a second predetermined number of images, fewer than the predetermined number of images, from the image batch if the predetermined number of images cannot be excluded based upon the calculation results provided by the first arithmetic operation unit; when the second predetermined number of images have been excluded by the exclusion unit, the second arithmetic operation unit individually calculates the evaluation value based upon the second factors, which include a factor different from the first factors, in correspondence to each image included in the image batch having undergone the exclusion processing; and the evaluation processing unit ranks each image included in the image batch having undergone the exclusion processing based upon the calculation results provided by the second arithmetic operation unit.

According to the 15th aspect of the present invention, in the image processing device according to the 13th aspect, it is preferred that the image processing device further comprises a selection unit that selects save-target images based upon rankings having been set by the evaluation processing unit.

According to the 16th aspect of the present invention, in the image processing device according to the 15th aspect, it is preferred that if there is no difference between the rankings, the selection unit selects an image having been obtained with timing closest to a timing with which a photographing instruction has been issued and an image with a largest evaluation value having been calculated based upon the second factors.

According to the 17th aspect of the present invention, a computer-program product that includes an image evaluation program, the image evaluation program comprises: first processing through which an image batch made up with a plurality of images is input; second processing through which an evaluation value is individually calculated based upon first factors in correspondence to each of the images included in the image batch; third processing through which exclusion processing is executed to exclude an image, in which calculation results provided through the second processing satisfies a predetermined condition, from the image batch; fourth processing through which an evaluation value is individually calculated based upon second factors that include a factor different from the first factors, in correspondence to each of the images included in the image batch having undergone the third processing; and fifth processing through which each image included in the image batch having undergone the third processing is individually ranked based upon calculation results obtained through the fourth processing.

According to the 18th aspect of the present invention, in the computer-program product according to the 17th aspect, it is preferred that the image batch includes a plurality of images obtained through a continuous shooting operation.

According to the 19th aspect of the present invention, in the computer-program product according to the 17th aspect, it is preferred that the second processing is executed by altering contents of the first factors in correspondence to a photographic scene when capturing the image batch.

According to the 20th aspect of the present invention, in the computer-program product according to the 19th aspect, it is preferred that the contents of the first factors used in the second processing are altered in correspondence to at least either whether or not the image batch includes a dynamic subject image or whether or not a person is present in the subject image.

According to the 21st aspect of the present invention, in the computer-program product according to the 17th aspect, it is preferred that some of the first factors and some of the second factors overlap.

According to the 22nd aspect of the present invention, in the computer-program product according to the 21st aspect, it is preferred that the overlapping factors include at least either sharpness information in a predetermined area of each of the images making up the image batch or luminance distribution information over an entire range of each image.

According to the 23rd aspect of the present invention, in the computer-program product according to the 17th aspect, it is preferred that the second factors include at least one of a factor related to a facial expression on a person captured in a subject image included in the image batch, a factor related to an areal size of a face of a person and a factor related to blurring manifesting in the subject image.

According to the 24th aspect of the present invention, in the computer-program product according to the 17th aspect, it is preferred that the image evaluation program further comprises sixth processing through which images to be excluded through the third processing are brought up on display at a display device.

According to the 25th aspect of the present invention, in the computer-program product according to the 24th aspect, it is preferred that a specific image among the images brought up on display at the display device through the sixth processing is not excluded in the third processing.

According to the 26th aspect of the present invention, in the computer-program product according to the 17th aspect, it is preferred that: a predetermined number of images are excluded from the image batch in the third processing based upon the calculation results obtained through the second processing; and the predetermined number can be altered.

According to the 27th aspect of the present invention, in the computer-program product according to the 26th aspect, it is preferred that: the exclusion processing is not executed in the third processing if the predetermined number of images cannot be excluded based upon the calculation results obtained through the second processing; when the exclusion processing is not executed in the third processing, the evaluation value is individually calculated in the fourth processing based upon the second factors in correspondence to each of the images in the entire image batch having been input through the first processing; and in the fifth processing, all the images in the entire image batch having been input are individually ranked based upon the calculation results obtained through the fourth processing.

According to the 28th aspect of the present invention, in the computer-program product according to the 26th aspect, it is preferred that: in the third processing, a second predetermined number of images, fewer than the predetermined number of images, are excluded from the image batch if the predetermined number of images cannot be excluded based upon the calculation results obtained through the second processing; in the fourth processing, the evaluation value is calculated based upon the second factors, which include a factor different from the first factors, in correspondence to each image included in the image batch having undergone the exclusion processing, when the second predetermined number of images have been excluded through the third processing; and in the fifth processing, each image included in the image batch having undergone the third processing is ranked based upon the calculation results obtained through the fourth processing.

According to the 29th aspect of the present invention, in the computer-program product according to the 27th aspect, it is preferred that the image evaluation program further comprises seventh processing through which save-target images are selected based upon rankings having been set through the fifth processing.

According to the 30th aspect of the present invention, in the computer-program product according to the 29th aspect, it is preferred that in the seventh processing, if there is no difference between the rankings, an image having been obtained with timing closest to a timing with which a photographing instruction has been issued and an image with a largest evaluation value having been calculated based upon the second factors are selected.

According to the 31st aspect of the present invention, an image processing device comprises a computer capable of executing the image evaluation program of the computer-program product according to the 17, and: the image batch is input from a recording medium having recorded therein a plurality of images; and the processing is executed.

BRIEF DESCRIPTION OF THE DRAWINGS

FIG. 4 indicates the relationship among the flag Case_PF, the flag Case_MV and the corresponding evaluation processing checkpoints.

FIG. 5A presents an example of a frame-out area in the lateral orientation, whereas FIG. 5B presents an example of a frame-out area in the longitudinal orientation.

FIG. 10 shows a display screen that may be brought up on display at the liquid crystal monitor.

DESCRIPTION OF PREFERRED EMBODIMENT

Figure 1:
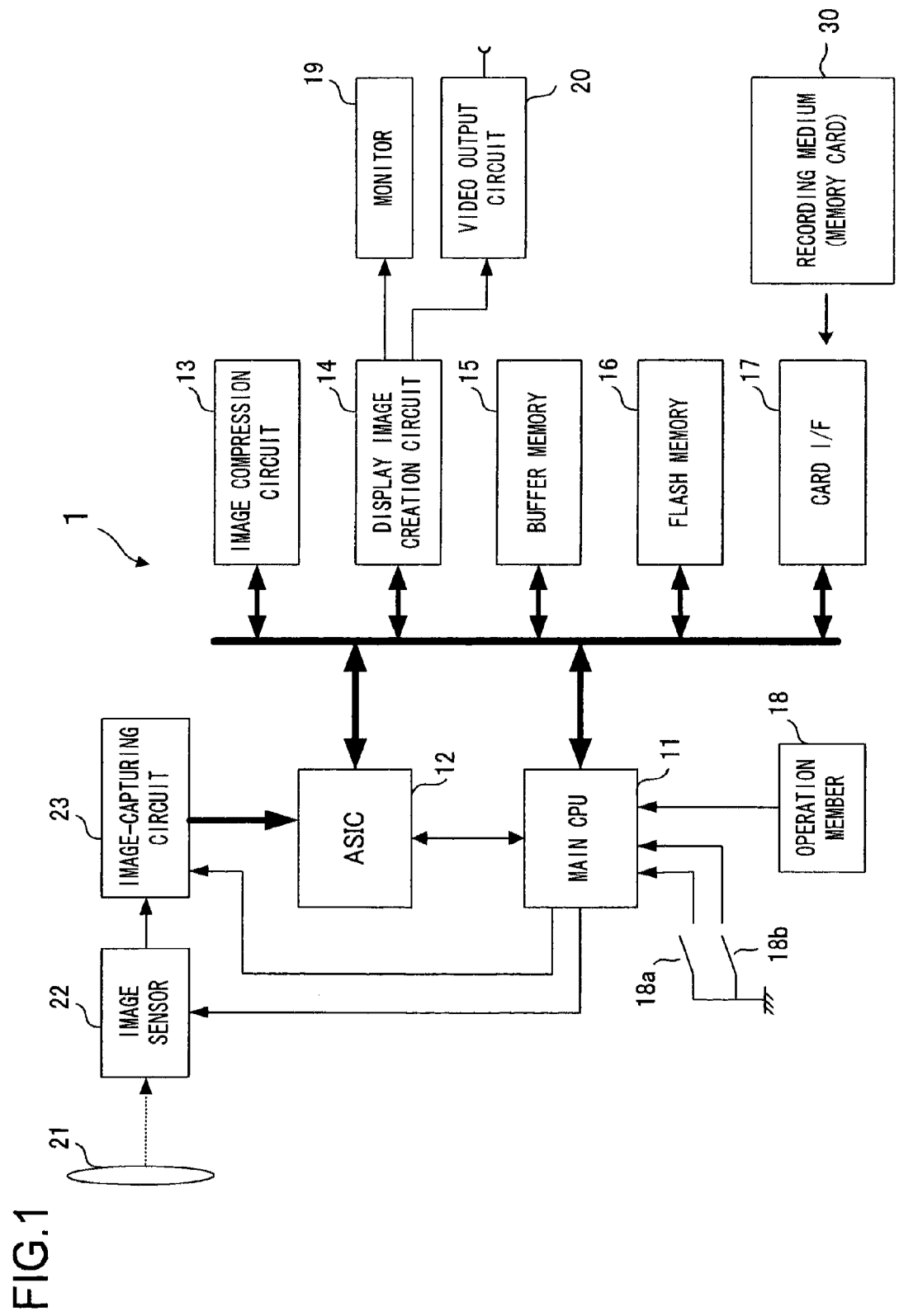
FIG. 1 is a block diagram showing the essential components constituting the electronic camera achieved in an embodiment of the present invention.

The following is a description of an embodiment of the present invention given in reference to the drawings. FIG. 1 is a block diagram showing the essential components constituting an electronic camera 1 achieved in the embodiment of the present invention. The electronic camera 1 is controlled by a main CPU 11.

A subject image is formed through a photographic lens 21 onto an image-capturing plane of an image sensor 22. The image sensor 22, which may be constituted with a CCD image sensor or a CMOS image sensor, outputs image signals, obtained by capturing the subject image formed on the image-capturing plane, to an image-capturing circuit 23. The image-capturing circuit 23 executes analog processing (such as gain control) on the photoelectric conversion signals output from the image sensor 22 and also converts the analog image signals to digital data at a built-in A/D conversion circuit.

The main CPU 11 executes predetermined arithmetic operations by using signals input thereto from various blocks and outputs control signals, generated based upon the arithmetic operation results, to the individual blocks. An image processing circuit 12, which may be constituted with, for instance, an ASIC, executes image processing on the digital image signals input thereto from the image-capturing circuit 23. The image processing executed at the image processing circuit includes, for instance, edge enhancement processing, color temperature adjustment (white balance adjustment) processing and format conversion processing executed on the image signals.

An image compression circuit 13 executes image compression processing so as to compress the image signals having undergone the processing at the image processing circuit 12 into, for instance, the JPEG format at a predetermined compression rate. A display image creation circuit 14 generates display signals to be used when displaying the captured image at a liquid crystal monitor 19.

At the liquid crystal monitor 19, constituted with a liquid crystal panel, an image and an operation menu screen or the like is brought up on display based upon display signals input thereto from the display image creation circuit 14. A video output circuit 20 generates, based upon display signals input thereto from the display image creation circuit 14, video signals that will enable an external display device to display an image, an operation menu screen or the like, and outputs the video signals thus generated.

A buffer memory 15, where data yet to undergo the image processing, data having undergone the image processing and data currently undergoing the image processing are temporarily stored, is also used to store an image file yet to be recorded into a recording medium 30 or an image file having been read out from the recording medium 30. The buffer memory in the embodiment is also used when temporarily storing pre-captured images obtained at the image sensor 22 at a predetermined frame rate before a photographing instruction is issued (before the shutter release button is pressed all the way down). The "pre-captured" images are to be described in detail later.

In a flash memory 16, a program executed by the main CPU 11, data needed when the main CPU 11 executes processing and the like are stored. The content of the program or the data stored in the flash memory 16 can be supplemented or modified based upon an instruction issued by the main CPU 11.

A card interface (I/F) 17 includes a connector (not shown) at which the storage medium 30 such as a memory card is connected. In response to an instruction issued by the main CPU 11, data can be written into the connected recording medium 30 or data in the connected recording medium 30 can be read out at the card interface 17. The recording medium 30 may be constituted with a memory card having a built-in semiconductor memory or a hard disk drive.

An operation member 18, which includes various buttons and switches at the electronic camera 1, outputs an operation signal corresponding to operational details of an operation performed at a specific button or switch constituting the operation member, such as a switching operation at a mode selector switch, to the main CPU 11. A halfway press switch 18a and a full press switch 18b each output an ON signal to the main CPU 11 by interlocking with depression of the shutter release button (not shown). The ON signal (halfway press operation signal) is output from the halfway press switch 18a as the shutter release button is depressed to a point roughly halfway through the full travel of the shutter release button and the ON signal output is cleared once the shutter release button held halfway down is released. The ON signal (full press operation signal) is output from the full press switch 18b as the shutter release button is depressed through the full travel of the shutter release button and the ON signal output is cleared once the shutter release button held all the way down is released. The halfway press operation signal constitutes an instruction for the main CPU 11 to start preparing for a photographing operation. The full press operation signal constitutes an instruction for the main CPU 11 to start obtaining an image to be recorded.

(Photographing Modes)

The electronic camera 1 may assume a regular shooting mode, in which it obtains a singe image frame each time the full press operation signal is output and records the photographic image into the recording medium 30, or a pre-capture shooting mode, in which it obtains a plurality of photographic still images in consecutive frames at a rate of 120 frames/second (120 FPS) at a high shutter speed (e.g., higher than 1/125 seconds) in response to the halfway press operation signal, and then, upon receiving the full press operation signal, the electronic camera 1 records predetermined numbers of images captured before and after the reception of the full press operation signal into the recording medium 30. One shooting mode can be switched to the other in response to an operation signal output from the operation member 18.

(Reproduction Mode)

The electronic camera 1 in the reproduction mode is able to reproduce and display at the liquid crystal monitor 19 a single image or a predetermined number of images having been recorded in either of the shooting modes described above.

Figure 2:
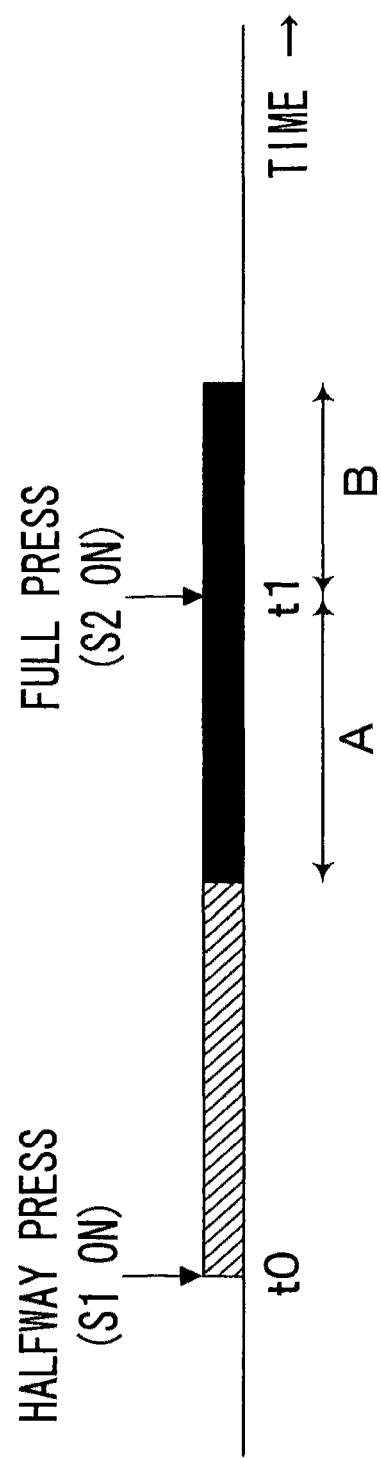
FIG. 2 indicates the timing with which images are obtained in a pre-capture shooting mode.

Since the pre-capture shooting mode is a feature characterizing the embodiment, the following explanation focuses on the operation executed in the pre-capture shooting mode. FIG. 2 illustrates the timing with which images are obtained in the pre-capture shooting mode.

(Pre-Capture Photographing Operation)

As a halfway press operation signal is input at a time point t0 in FIG. 2, the main CPU 11 starts shutter release standby processing. During the shutter release standby processing, exposure calculation and focus adjustment are executed by the main CPU 11 as subject images are captured at a frame rate of, for instance, 120 frames/second (120 FPS) and the image data thus obtained are sequentially stored into the buffer memory 15.

A predetermined memory capacity assuring adequate memory space the buffer memory 15 for the pre-capture photographing operation is allocated in advance. If the number of images stored into the buffer memory 15 following the time point t0 reaches a predetermined value (e.g., A frames), the main CPU 11 deletes older images by writing a new image over the oldest image. Through these measures, the memory space in the buffer memory 15 used for the pre-capture photographing operation can be controlled to match the predetermined capacity allocation.

As a full press operation signal is input at a time point t1, the main CPU 11 starts shutter release processing. In the shutter release processing, (A+B) image frames made up with A image frames captured before the time point t1 and B image frames captured following the time point t1, are designated as recording candidate images that may be recorded into the recording medium 30.

The main CPU 11 selects a predetermined number, which is indicated in advance through a menu operation, of image frames (C<(A+B) among the (A+B) image frames and has the C image frames individually recorded into the recording medium 30 in relation to one another. The filled block in FIG. 2 indicates a period of time during which the (A+B) image frames, designated as the recording candidate images, are obtained. The shaded block indicates a period of time during which the image frames having been stored into the buffer memory 15 only to be erased through overwrite, are obtained.

In the embodiment, either a first recording method through which the C image frames among the (A+B) image frames are recorded into the recording medium 30 or a second recording method through which the (A+B) image frames are all recorded into the recording medium 30 can be selected as the recording method in response to an operation signal issued from the operation member 18. The following description of the embodiment is provided by assuming that the first recording method has been selected.

Figure 3:
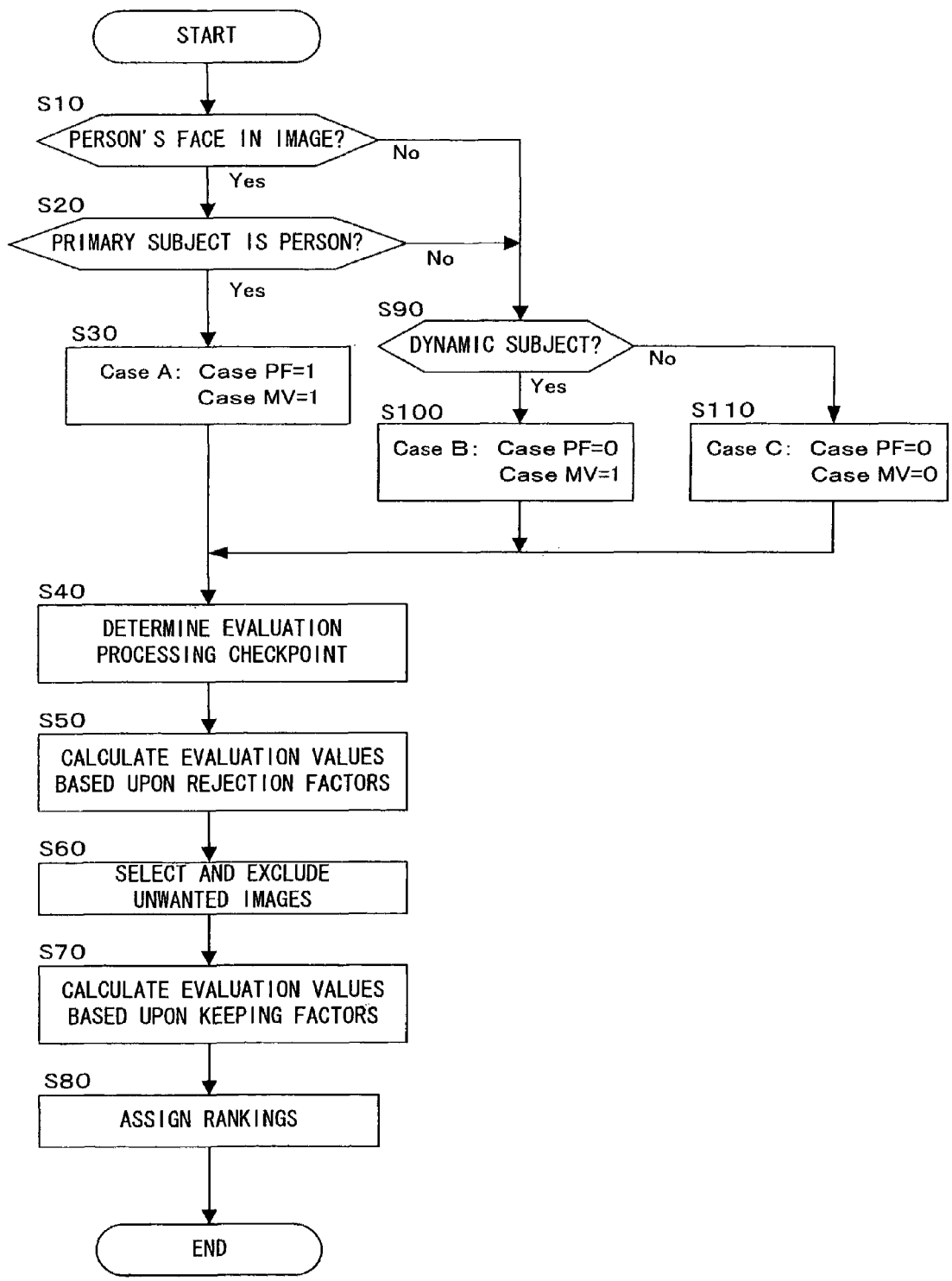
FIG. 3 presents a flowchart of the image evaluation processing executed by the main CPU.

The main CPU 11 selects the C image frames among the (A+B) image frames as described below. FIG. 3 presents a flowchart of the image evaluation processing executed by the main CPU 11. The main CPU 11 starts up the processing shown in FIG. 3 as the (A+B) image frames are input to the buffer memory 15.

In step S10 in FIG. 3, the main CPU 11 makes a decision as to whether or not a person's "face" is included in an image frame. The main CPU 11 executes "face" detection processing for each of the (A+B)=N image frames in sequence. Since the "face" detection processing is executed through a technology of the known art, its explanation is not provided. Upon judging that a "face" is included in any of the image frames, the main CPU 11 makes an affirmative decision in step S10 and the operation proceeds to step S20. However, upon judging that a "face" is not included in any image frame, the main CPU 11 makes a negative decision in step S10 and the operation proceeds to step S90.

In step S20, the main CPU 11 makes a decision as to whether or not the person is a primary photographic subject. For instance, 1 may be set at a counter h(n) if the number of pixels constituting a "face" detected in an nth image frame ($1 \leq n \leq N$) is equal to or greater than a predetermined value, whereas a value of 0 may be set at the counter h(n) if no "face" is detected in the nth image or if the number of pixels constituting the detected "face" is smaller than the predetermined value. In such a case, the main CPU 11 makes an affirmative decision in step S20 if the counting results $PF=\Sigma h(n)$ obtained by tabulating the counter values corresponding to the N image frames is greater than th_pf (PF>th_pf, th_pf represents a predetermined decision-making threshold value), and the operation proceeds to step S30. Under these circumstances, a person is judged to be the primary subject. However, if PF<th_pf is true, the main CPU 11 makes a negative decision in step S20 and the operation proceeds to step S90. In this situation, it is determined that the primary subject is not a person.

In step S30, to which the operation proceeds upon determining that a person is the primary subject, the main CPU 11 designates the current session as a "Case_A". In this situation, the main CPU 11 sets 1 for a flag "Case_PF" and 1 for a flag "Case_MV", before the operation proceeds to step S40. The flag "Case_PF" is set to 1 when a person is the primary subject and is set to 0 if the primary subject is not a person. While the flag "Case_MV" is a flag that indicates whether or not any differences manifest between individual image frames, it defaults to 1 whenever the primary subject is judged to be a person.

In step S90, the main CPU 11 makes a decision as to whether or not the subject is a dynamic subject. Differences among individual image frames usually occur if the subject is moving, if the angle of field changes through a zoom operation or if the electronic camera 1 is panned. In the embodiment, differences between the image data in the first frame and the image data in the Nth frame are calculated in correspondence to the individual pixels in sequence, i.e., the difference between the image data at one pixel in the first frame and the image data at the corresponding pixel in the Nth frame is calculated at a time, and then, the total sum of the differences is calculated (see expression (1) below).

$$Del\_FR = \Sigma xy |1(x,y,1) - 1(x,y,N)| \qquad (1)$$

The image data (x, y) in the first frame are notated as 1 (x, y, 1) and the image data (x, y) in the Nth frame are notated as 1 (x, y, N) in the expression above.

If the results of the arithmetic operation executed as expressed in (1) above indicate that Del_FR>th_fr (th-fr is a predetermined decision-making threshold value), the main CPU 11 makes an affirmative decision in step S90 and the operation proceeds to step S100. In this case, it is judged that a frame-to-frame displacement attributable to at least one of; a movement of the subject, a change in the angle of field and a panning operation, manifests. If the Del_FR<th_fr is true, the main CPU 11 makes a negative decision in step S90 and the operation proceeds to step S110. In this situation, it is judged that there is no frame-to-frame displacement and thus a substantially still state is sustained.

In step S100, to which the operation proceeds after determining that the primary subject is not a person and that there is frame-to-frame displacement, the main CPU 11 designates the current session as a "Case_B". The main CPU 11 sets 0 for the flag "Case_PF" and 1 for the flag "Case_MV" before proceeding to step S40. The flag "Case_MV" is a flag that indicates whether or not there are differences manifesting between individual image frames. It is to be noted that in a "Case_B", the subsequent processing is executed by designating as the "primary subject" a closest subject present or a subject present in an area selected as a focusing area by the user or a focusing area automatically selected in the camera.

In step S110, to which the operation proceeds after judging that the primary subject is not a person and that no frame-to-frame displacement manifests, the main CPU 11 designates the current session as a "Case_C". The main CPU 11 sets 0 for the flag "Case_PF" and 0 for the flag "Case_MV" before proceeding to step S40.

In step S40, the main CPU 11 determines evaluation processing checkpoints in correspondence to the values having been set for the flag "Case_PF" and the flag "Case_MV" (i.e., in correspondence to the current session designation; "Case_A", Case_B" or "Case_C") and then the operation proceeds to step S50. FIG. 4 presents a table in reference to which the relationship among the flag "Case_PF", the flag "Case_MV" and the corresponding evaluation processing checkpoints is to be described. In the embodiment, an evaluation value is calculated whenever "ON" is entered for an evaluation value processing checkpoint but evaluation value calculation is skipped if "off" is entered for an evaluation processing checkpoint.

In the description of the embodiment, evaluation processing checkpoints 41 through 46, which are evaluation factors used to calculate evaluation values based upon which X image frames are rejected or excluded in order to retain C image files out of the N image frames, will be referred to as rejection factors (or exclusion factors). It is desirable to set X to a value greater than N/2 in order to lessen the load of the ranking processing to be detailed later. In addition, evaluation processing checkpoints 45 through 50, which are evaluation factors used to calculate evaluation values based upon which the C image frames are ranked to indicate their desirability, will be referred to as keeping (saving) factors (or optimality evaluation factors). The evaluation processing checkpoints 45 and 46 are both rejection factors and keeping factors. The individual evaluation factors will be described in detail later.

In step S50, the main CPU 11 calculates evaluation values by using the evaluation factors corresponding to some of the evaluation processing checkpoints determined in step S40, and then the operation proceeds to step S60. In step S60, the main CPU 11 selects X image frames (unwanted images) with the lowest evaluation values (with the highest levels of undesirability) and takes the selected X images out of the N image frames so as to retain C images, before proceeding to step S70.

In step S70, the main CPU 11 calculates evaluation values by using the evaluation factors corresponding to the evaluation processing checkpoints determined in step S40, and then the operation proceeds to step S80. In step S80, the main CPU 11 ranks the images in the C images in an order reflecting their evaluation values by ranking the image having the highest evaluation value at the top, before ending the processing in FIG. 3.

The evaluation factors mentioned above are now described in detail.

(Detected Proximity of a Plurality of People)

As the evaluation processing checkpoint 41, an evaluation value $H1(n)$, which indicates the level of proximity among a plurality of people in the evaluation target image, is calculated. The main CPU 11 calculates the following value if a size S of a "face" area detected in each image frame $n(1 \leq n \leq N)$ among the N image frames exceeds a specific areal size value set in advance. The areal size may be indicated by the number of pixels constituting the "face" area.

The main CPU 11 counts "faces" detected in the image frame n with their "face" areas S each exceeding the specific areal size value and designates the value indicating the number of "faces" having been counted (i.e., the number of people) as KS(n). In addition, it designates the size of a "face" area detected in the image frame n as Sk(n). The coordinates of a point equivalent to the center of the particular "face" area in the image n are notated as $(x\_k(n), y\_k(n))$. Furthermore, the side of the "face" area extending along the horizontal direction is notated as $Lx\_k(n)$, whereas the side of the "face" area extending along the vertical direction is notated as $Ly\_k(n)$. n is the frame number that indicates a specific image frame among the image frames constituting the N continuously-shot images, whereas k is the "face" number that indicates a specific "face" area, the size of which exceeds specific areal size value in the image frame n.

If $KS(n) \leq 1$, it is not necessary to consider proximity between people and, accordingly, the main CPU 11 sets the evaluation value $H1(n)$, which indicates the proximity among a plurality of people, to 1. If, on the other hand, $KS(n)>1$, the following loop processing is executed m times. It is to be noted that m=Combination (KS(n), 2). For instance, if KS(n)=2;

a horizontal distance x between centers of the "face" areas is calculated as; $R1x=|x\_1(n)-x\_2(n)|$ a vertical distance y between centers of the "face" areas is calculated as; $R1y=|y\_1(n)+y\_2(n)|$ ½ of the horizontal side of one "face" area is added to ½ of the horizontal side of the other "face" area as; $R2x=(Lx\_1(n)+Lx\_2(n))/2$ ½ of the vertical side of one "face" area is added to ½ of the vertical side of the other "face" area as; $R2y=(Lx\_1(n)+Ly\_2(n))/2$ If R1x<R2x or R1y<R2y is true, hm(n) is set to 1 but otherwise, hm(n) is set to 0.

This processing is repeatedly executed m times so as to cover all the possible combinations of "faces" detected in the image (so as to cover all the possible combinations of people in the image).

If $\Sigma hm(n)>0$ is true for the total sum of the values having been set for hm(n) as described above, 0 is set for the proximity evaluation value $H1(n)$ for the image n. However, if $\Sigma hm(n)=0$ is true for the total sum of the values having been set for hm(n) as described above, 1 is set for the proximity evaluation value $H1(n)$ for the image n.

(Detected Unnecessary Object in Face Area)

For the evaluation processing checkpoint 42, an evaluation value $H2(n)$, which indicates the reliability of the "face" detection in the evaluation target image is calculated. The main CPU 11 obtains reliability information (indicating a value between a minimum value 0 and a maximum value 1) having become available during the "face" detection processing, which corresponds to the "face" area with the largest areal size S among the face areas detected in each image frame n (1≤n≤N) making up the N image frames. The reliability information may be provided as a "face"-likeness index or a "face" curvature index. The "face"-likeness index may be calculated by extracting various characteristic quantities (color information, information related to the positional relationship among various facial parts (the eyes, the nose, the mouth, etc.) from the image in the "face" area having been detected and evaluating the extracted characteristic quantities as a whole so as to measure the overall "face-likeness", which will indicate the level of reliability of the "face" detection. The level of reliability of the "face" detection may be calculated as a "face" curvature index by investigating whether or not the curvature of the outline of the face extracted through edge detection or the like, changes in an unnatural manner. For instance, on the premise that the extracted edge (outline) should be a curve (or an ellipse), any abrupt change in the edge (any disruption in the outline) may be assumed to be attributable to the presence of hair or a hand covering the face and, accordingly, the level of reliability (the evaluation value $H2(n)$) may be lowered. The main CPU 11 uses the unnecessary face area object evaluation value $H2(n)$ as the reliability information for the particular image frame n.

(Detected Eye Closure).

For the evaluation processing checkpoint 43, an evaluation value $H3(n)$, which indicates whether or not eyes are closed in the evaluation target image is calculated. The main CPU 11 executes eye closure detection for the "face" area taking up the largest area S, detected in each image frame n (1≤n≤N) among the N image frames. Since the eye closure detection processing is of the known art, its explanation is not provided. Based upon the eye closure detection results, the main CPU 11 sets the eye closure evaluation value $H3(n)$ for the image frame n to 0 if the eyes are closed. If, on the other hand, the eyes are not closed, it sets the eye closure evaluation value $H3(n)$ to 1.

(Detected Frame-Out)

For the evaluation processing checkpoint 44, an evaluation value $H4(n)$, which indicates whether or not the area taken up by the "primary subject", i.e., the "face" area in the evaluation target image in a "Case_A" or the "primary subject" area assumed to be taken up by the primary subject other than a person in a "Case_B", is outside the frame is calculated. The main CPU 11 obtains the central coordinates (F0_x, F0_y) of the "face" ("primary subject") area furthest away from the image plane center among the "face" ("primary subject") areas with the areal sizes S thereof exceeding the predetermined areal size value having been detected in the particular image frame n(1≤n≤N) among the N image frames. It sets a frame-out area such as that shown in FIG. 5A or FIG. 5B and determines the frame-out evaluation value $H4(n)$ depending upon whether or not the coordinate point (F0_x, F0_y) is present in the frame-out area.

FIG. 5A presents an example of a frame-out area that may be set for an image frame n with a lateral orientation. The main CPU 11 decides that a frame-out has occurred if the point indicated by the central coordinates (F0_x, F0_y) is in a shaded area 51 and sets the frame-out evaluation value H4n for the image frame n to 0. However, if the point indicated by the central coordinates (F0_x, F0_y) is not present in the shaded area 51, it decides that a frame-out has not occurred and sets the frame-out evaluation value $H4(n)$ to 1. FIG. 5B presents an example of a frame-out area that may be set for an image frame n with a longitudinal orientation. As it does for an image frame with a lateral orientation, the main CPU 11 determines the frame-out evaluation value $H4(n)$ depending upon whether or not the point indicated by the central coordinates (F0_x, F0_y) is in a shaded area 52. The shaded area 51 or 52 may be set in the image frame so that it takes up a left end area and a right end area of the image frame, each over a width equal to ⅛ of the length of the horizontal side and takes up a bottom end area over a range equivalent to ⅛ of the length of the vertical side.

It is to be noted that instead of making a decision as to whether or not a frame-out has occurred based upon the central coordinates (F0_x, F0_y) of the "face" ("primary subject") area furthest away from the image plane center, the decision as to whether or not a frame-out has occurred may be made based upon whether or not a coordinate point (FP_x, FP_y) corresponding to the focus point (the center of a focus area (AF area)) furthest away from the image plane center among the focus points having been used for the focusing operation is present in the shaded area 51 or 52 in FIG. 5A or FIG. 5B.

(AF•Detected Face Area Blur/Sharpness)

For the evaluation processing checkpoint 45, an evaluation value $H50(n)$, which indicates the extent of blurring detected in the evaluation target image and an evaluation value $H51(n)$, which indicates the sharpness of the evaluation target image, are individually calculated. The main CPU 11 obtains an average value HPF_av(n) of the HPF (high pass filter) output values corresponding to the "face" area (in a "Case_A") with the largest area S having been detected in the particular image frame n (1≤n≤N) among the N image frames. The average value HPF_av(n), obtained by extracting high-frequency component data in the pixel data in the "face" area and then averaging the extracted high-frequency component data, is an ideal indicator based upon which a decision as to whether the contrast level is high or low can be made.

If HPF_av(n)<HPF_k is true, the main CPU 11 sets HPF_av(n)/HPF_k for the blur evaluation value $H50(n)$ in correspondence to the image frame n. If, on the other hand, HPF_av(n)≥HPF_k is true, it sets the blur evaluation value $H50(n)$ to 1. HPF_k is a predetermined value which may be, for instance, the average value HPF_av(n) of the HPF output values having been calculated in advance in a focus match state.

In addition, the main CPU 11 sets HPF_av(n)/HPF_k for the sharpness evaluation value $H51(n)$ in correspondence to the image frame n. HPF_k is the predetermined value described above.

It is to be noted that the blur evaluation value $H50(n)$ related to the "face" and the sharpness evaluation value $H51(n)$ related to the "face" are obtained by ascertaining the average value HPF_av(n) of the HPF (high pass filter) output values related to the pixel data in the "face" area with the largest areal size S in the description provided above. As an alternative, an average value HPF_av(n) of the HPF (high pass filter) output values related to the pixel data in the focus area (AF area) having been selected for the focusing operation may be obtained (the alternative average value is used in a "Case_B" or a "Case_C"). Based upon the average value of the HPF (high pass filter) output values related to the pixel data in the AF area, a blur evaluation value $H50(n)$ and a sharpness evaluation value $H51(n)$ corresponding to the subject for which the focusing operation has been executed, are obtained.

(Overall Luminance Histogram)

For the evaluation processing checkpoint 46, an evaluation value $H6(n)$, indicating the frequency with which clipped whites or clipped blacks occur in the evaluation target image is calculated. The main CPU 11 obtains through calculation a luminance histogram for the overall image (by using all the pixel data constituting the image) in correspondence to each image frame n (1≤n≤N) among the N image frames. It designates the frequency corresponding to the maximum gradation value (255 for 8-bit data) as HL and designates the frequency corresponding to the minimum gradation value (0) as LL. The main CPU 11 then sets (HL+LL)/(entire number of pixels) for the evaluation value H6(*n*), which indicates a standardized clipped whites/clipped blacks frequency rate.

It is to be noted that the evaluation value may be calculated by using the frequency of data indicating values equal to or greater than a predetermined first decision-making threshold value instead of the maximum gradation value frequency and using the frequency of data indicating values equal to or less than a predetermined second decision-making threshold value instead of the minimum gradation value frequency.

(Detected Face Area)

For the evaluation processing checkpoint 47, an evaluation value H7(*n*), which indicates the largest area taken up by a "face" in the evaluation target image, is calculated. The main CPU 11 calculates an area S(n) taken up by the "face" area with the largest area size S having been detected in the particular image frame n (1≤n≤N) among the N image frames. As explained earlier, the areal size is represented by the number of pixels making up the "face" area. The main CPU 11 sets S(n) for the face area evaluation value H7(*n*).

(Detected Smile Factor)

For the evaluation processing checkpoint 48, an evaluation value H8(*n*), which indicates the level of smile in a "face" in the evaluation target image is calculated. The main CPU 11 ascertains the smile level for a "face" having been detected in the particular image frame n (1≤n≤N) among the N image frames. The smile level is determined at the time of the "face" detection processing explained earlier. For instance, level 3 (full laughter), level 2 (moderate laughter) or level 1 (slight smile) may be set as the smile level. The main CPU 11 sets the smile level having been determined as the smile factor evaluation value H8(*n*).

(Detected Subject Size)

Figure 6:
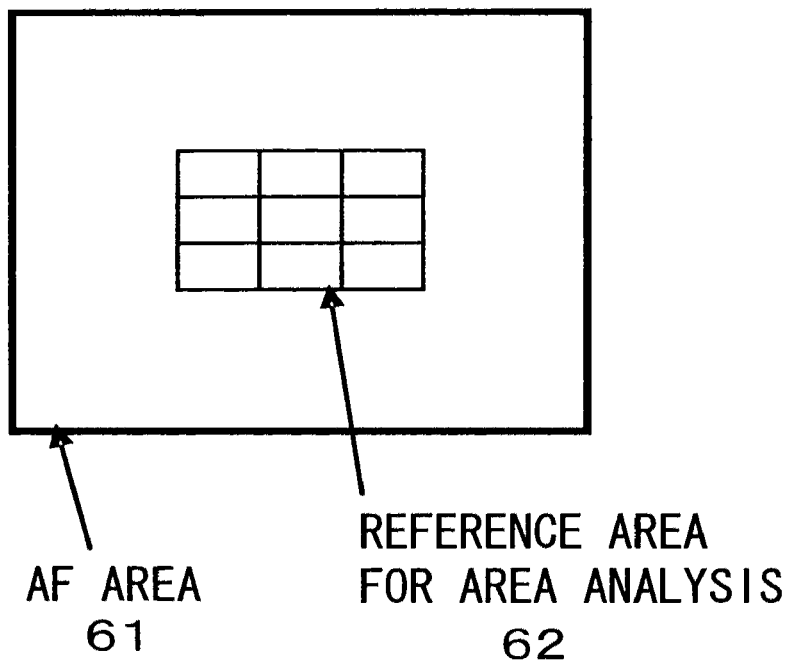
FIG. 6 shows an AF area and a miniscule central area that may be set.

For the evaluation processing checkpoint 49, an evaluation value H9(*n*), which indicates the size of a subject in the evaluation target image, is calculated. The main CPU 11 determines an average luminance Y0 and an average color (Cr0, Cb0) in correspondence to a miniscule central area (e.g., a 3×3 pixel area) within the focus area (AF area) for which the focusing operation has been executed in the particular image frame n (1≤n≤N) among the N image frames. FIG. 6 illustrates how an AF area 61 and a miniscule central area 62 may be set. The miniscule central area 62 is a reference area set for purposes of area analysis executed as described below.

Based upon the average luminance Y0 and the average color (Cr0, Cb0) in the image frame n, the main CPU 11 calculates the subject size evaluation value H9(*n*) through the procedure described below.

(i) A flag indicating a value of 1 is put up in the miniscule central area.

(ii) flags are put up if surrounding pixel values are equal to or less than predetermined tolerance values rn (n=1:Y, 2:Cr, 3:Cb). More specifically;

A flag 1 is set to 0 if (|Y(x, y)−Y0|>r1) is true, but the flag 1 is set to 1 otherwise.

A flag 2 is set to 0 if (|Cr(x, y)−Cr0|>r2) is true, but the flag 2 is set to 1 otherwise.

A flag 3 is set to 0 if (|Cb(x, y)−Cb0|>r3) is true, but the flag 3 is set to 1 otherwise.

if (flag 1*flag 2*flag 3=1) is true for flag 1 through flag 3, a flag is set to 1 but the flag set 0 for the flag otherwise.

Figure 7:
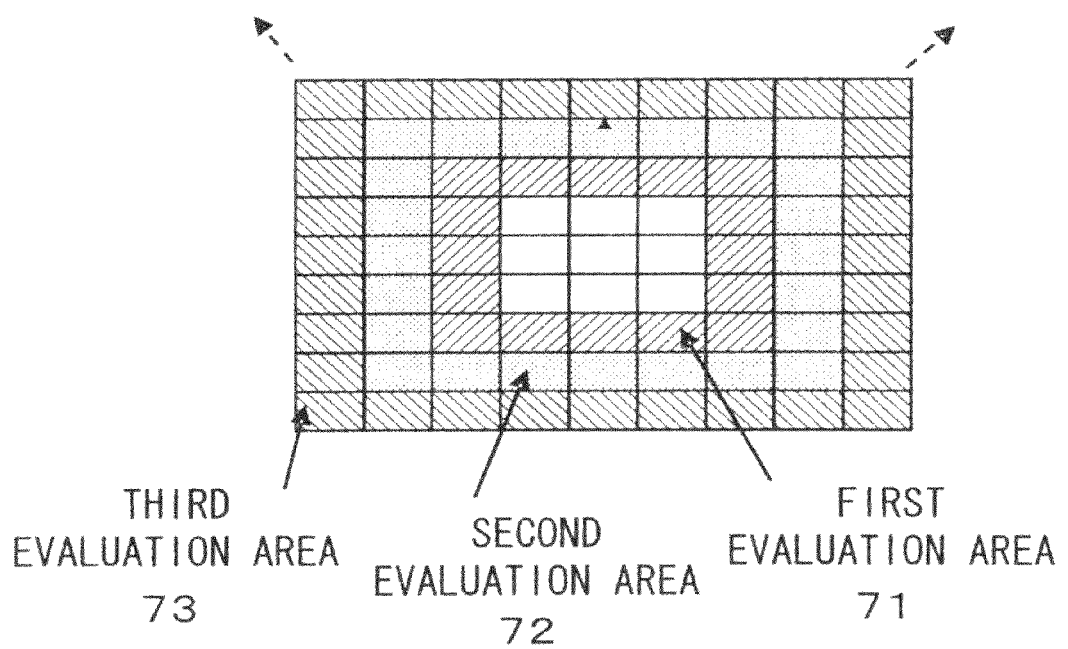
FIG. 7 shows evaluation target areas that may be set.

(iii) The initial evaluation target area is defined by the sides enclosing the very small area 62, i.e., the reference area and the parameter is gradually shifted outward (first evaluation area 71→second evaluation area 72→third evaluation area 73 . . . ), until all the flags indicate 0, at which point the processing ends. FIG. 7 presents an example of how the evaluation target area may expand from the evaluation target area 71 through the evaluation target area 73.

(iv) A value representing the total area D accounted for by the areas where flags indicate a value of 1 is calculated. The main CPU 11 sets D as the subject size evaluation value H9(*n*) in the nth image.

(Detected Composition Optimality)

For the evaluation processing checkpoint 50, an evaluation value H10(*n*), which indicates the composition optimality of the evaluation target image is calculated. The main CPU 11 obtains the central coordinates (Qx, Qy) of the focus area (AF area) for which the focusing operation has been executed or a "face" area having been detected in the particular image frame n (1≤n≤N) among the N image frames.

Figure 8:
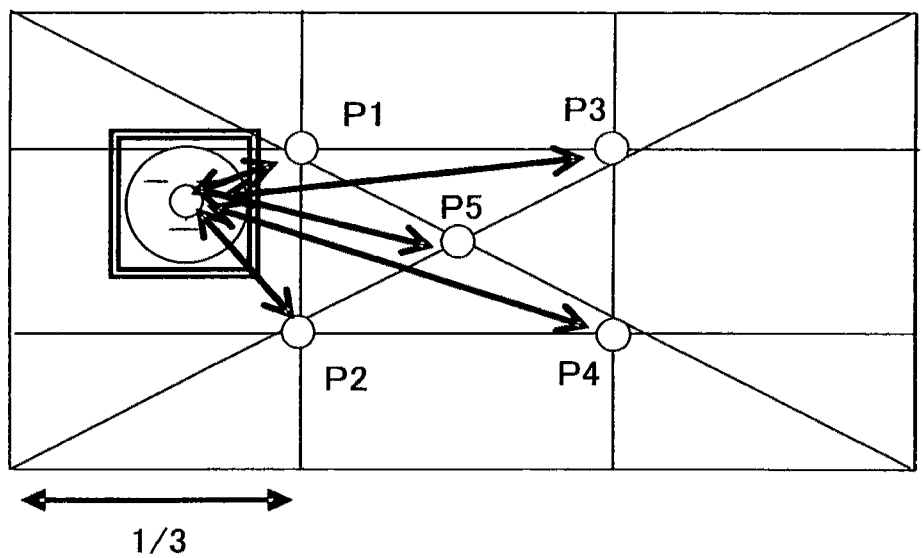
FIG. 8 illustrates how an evaluation value representing a composition optimality may be calculated.

As shown in FIG. 8, the main CPU 11 further sets five composition evaluation coordinate points P1 to P5 within the image plane and individually calculates the distance KS(m) (m=1, 2, . . . 5) between each of the five points and the central coordinate point (Qx, Qy) as expressed in (2) below.

$$KS(m) = \sqrt{(P(m,x)-Qx)^2 + (P(P(m,y)-Qy)^2} \quad (2)$$

when m=1, 2, . . . 5

The main CPU 11 designates the smallest value Min (KS (m)) among the five distances KS(m) thus calculated as the composition evaluation value H10(*n*) for the nth image.

Now, the exclusion processing (i.e., the processing executed to select the C optimal candidate images) executed in step S60 as mentioned earlier to reject the X images is described in detail. The main CPU 11 selects the optimal candidate images by calculating unwanted image evaluation values RMV as outlined below. It is to be noted that am, brn and cm each represent a predetermined coefficient.
in a "Case_A";

$$RMV(n) = ar1*H1(n) + ar2*H2(n) + ar3*H3(n) + ar4*H4(n) + ar5*H50(n) + ar6*H6(n)$$

in a "Case_B";

$$RMV(n) = br4*H4(n) + br5*H50(n) + br6*H6(n)$$

in a "Case_B";
calculation of the unwanted image evaluation value RMV is skipped.

An unwanted image evaluation value RMV closer to 0 indicates a higher level of undesirability. The main CPU 11 calculates RMV(n) values for all the images (N images) input thereto in correspondence to the applicable case, counts out the X images with the highest levels of undesirability and adjusts the value X so as to equalize the remainder C, obtained by taking the X images out of the N images, to a predetermined value (e.g., any value in the 5 to 10 range). The remainder C represents the number of optimal candidate images.

The ranking processing (i.e., ranking setting processing) executed in step S80 as mentioned earlier, is now described in detail. The main CPU 11 calculates an image optimality evaluation value OPT as outlined below in correspondence to each of the C optimal candidate images and displays the rankings or selects a representative (optimal) image. It is to be noted that aon, bon and con each represent a predetermined coefficient.

in a "Case_A";

$$OPT(n)=ao5*H51(n)+ao6*H6(n)+ao7*H7(n)+ao8*H8(n)+ao10*H10(n)$$

in a "Case_B";

$$OPT(n)=bo5*H51(n)+bo6*H6(n)+bo9*H9(n)+bo10*H10(n)$$

in a "Case_C";

$$OPT(n)=co5*H51(n)+co6*H6(n)$$

The main CPU 11 calculates OPT(n) for each of the C images having been selected (i.e., the 5 to 10 images in the embodiment) in correspondence to the applicable case, ranks the selected images by awarding the highest rank to the image having the highest OPT value and designates the image with the highest OPT value as a representative (optimal) image.

The following advantages are achieved through the embodiment described above.

(1) The electronic camera 1 includes the main CPU 11, which individually calculates evaluation values based upon rejection factors in correspondence to each of the plurality of images making up the batch of images having been input, executes exclusion processing based upon the results of the calculation executed by the main CPU 11 so as to exclude images with the calculation results thereof satisfying predetermined conditions from the batch of images, calculates evaluation values based upon keeping factors, which include factors other than the exclusion factors, for each of the images included in the batch of images having undergone the exclusion processing, and individually ranks the images included in the batch of images having undergone the exclusion processing based upon the results of the evaluation value calculation having been executed by the main CPU 11. As a result, best shot candidate images can be quickly selected from the initial batch of images.

(2) The batch of images is made up with a plurality of images obtained through continuous shooting and thus, best shot candidate images can be quickly selected from the batch of images obtained through the continuous shooting operation.

(3) The main CPU 11 modifies the details of the rejection factors in correspondence to the particulars of the photographic scene in which the batch of images are captured. This means that evaluation values, better suited to the particular photographic scene than evaluation values calculated based upon fixed rejection factors are obtained. Consequently, best shot candidate images can be selected with better accuracy.

(4) The main CPU executing the processing described in (3) above adjusts the details of the rejection factors in correspondence to at least either the presence/absence of any movement in the subject image in the batch of images or the presence/absence of a person in the subject image. Thus, optimal best shot candidate images can be reliably selected by taking into consideration any movement of the subject or the presence/absence of a person.

(5) The main CPU 11 excludes images accounting for at least half of the initial batch of images by checking the results of the evaluation value calculation executed based upon the rejection factors. Since the onus of the processing is significantly reduced after the exclusion processing, best shot candidate images can be selected even more quickly compared to best shot candidate image selection executed without such exclusion processing.

(6) Since some of the rejection factors and some of the keeping factors overlap, overall processing time can be reduced, compared to the length of processing time that would be required without the overlap.

(7) Since the keeping factors include at least one of a factor related to the facial expression on a person in the subject image included in the batch of images, a factor related to the area taken up by the face of the person and a factor related to any blurring in the subject image, optimal best shot image candidates can be reliably selected.

(Variation 1)

As long as evaluation values are calculated based upon rejection factors, evaluation values may be calculated in step S50 by selecting only some of the evaluation processing checkpoints instead of calculating the evaluation values in correspondence to all of the evaluation processing checkpoints 41 through 46. In addition, as long as evaluation values are calculated based upon keeping factors, evaluation values may be calculated in step S70 by selecting only some of the evaluation processing checkpoints instead of calculating the evaluation values in correspondence to all of the evaluation processing checkpoints 45 through 50.

(Variation 2)

The C images recorded in the recording medium 30 through the first recording method can be reproduced and brought up on display at the liquid crystal monitor 19. The main CPU 11 reproduces and displays the representative (optimal) image alone in response to an instruction for reproducing and displaying only the representative (optimal) image among the C images. If, on the other hand, an instruction for reproducing and displaying all of the C images is issued, the main CPU may reproduce and display the C images one at a time in sequence in the order of their rankings, or bring up on display an at-a-glance list of the plurality of images together with the corresponding ranking information.

In addition, the (A+B) images recorded in the recording medium 30 through the second recording method can be reproduced and brought up on display at the liquid crystal monitor 19. The main CPU 11 reproduces and displays the representative (optimal) image alone in response to an instruction for reproducing and displaying only the representative (optimal) image among the (A+B) images. If, on the other hand, an instruction for reproducing and displaying the C images among the (A+B) images is issued, the main CPU may reproduce and display the C images one at a time in sequence in the order of their rankings, or bring up on display an at-a-glance list of the plurality of images together with the corresponding ranking information.

(Variation 3)

Figure 9:
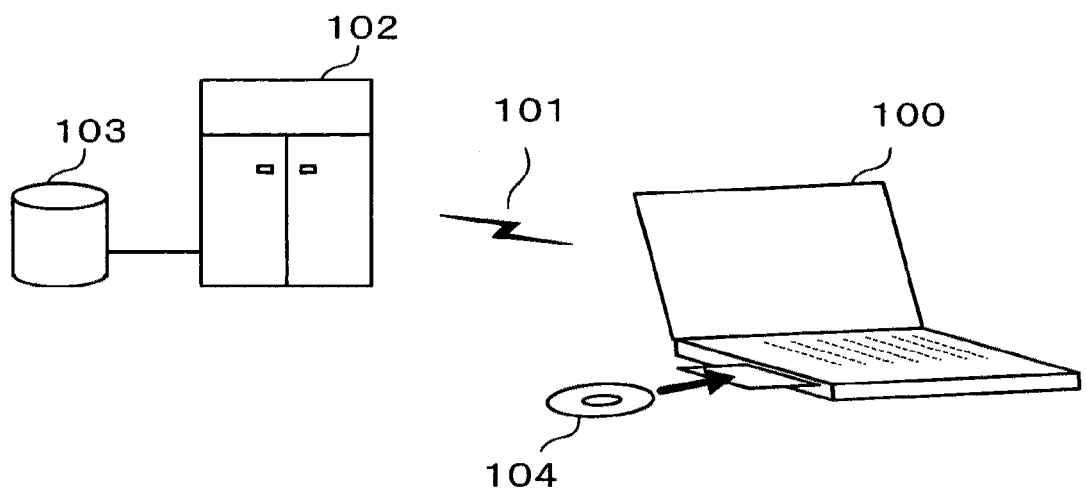
FIG. 9 presents an example of a computer system.

An image processing device may be configured by allowing a computer device 100 shown in FIG. 9 to execute an image evaluation processing program that enables execution of the processing shown in FIG. 3. In order for the personal computer 100 to be able to function as an image processing device by executing the image evaluation processing program, the program must be loaded into a data storage device in the personal computer 100.

The program may be loaded into the personal computer 100 by inserting a recording medium 104, such as a CD-ROM, with the program stored therein, at the personal computer 100, or it may be loaded into the personal computer 100 via a communication line 101 such as a network. The program to be downloaded via the communication line 101 must be stored in, for instance, a hard disk device 103 or the like of a server (computer) 102 connected to the communication line 101. The image evaluation processing program can be distributed as a computer-program product assuming any of various modes including the storage medium 104 and the communication line 101.

(Variation 4)

During the processing executed as shown in the flowchart in FIG. 3, as described earlier, the X image frames (unwanted images) with the lowest evaluation values (with the highest levels of undesirability) may be brought up on display at the liquid crystal monitor 19 following step S80. The following description of Variation 4 is provided by assuming that the first recording method whereby C images among the (A+B) image frames are recorded into the recording medium 30, has been selected as the recording method and that N=(A+B)=20 and C=5. Namely, in Variation 4, 15 (=20−5) image frames (unwanted images) with the lowest evaluation values (with the highest levels of undesirability) are brought up on display at the liquid crystal monitor 19 so that the user is able to visually verify them before the five selected images among the 20 images are recorded into the recording medium 30.

The main CPU 11 in Variation 4, issues an instruction for the display image creation circuit 14 so as to bring up a display screen such as that shown in FIG. 10, at the liquid crystal monitor 19. FIG. 10 presents an example of a display screen that may be brought up at the liquid crystal monitor 19. A thumbnail display of the 15 image frames (unwanted images) picked as rejection candidates is provided over an area P11 in FIG. 10. A thumbnail display of the five image frames selected as save candidates is provided over an area Q11. The numerical values 1 through 5 above the five image frames indicate the rankings awarded in step S80.

The main CPU 11 in Variation 4 displays a cursor P12 at a specific image frame (e.g., the image frame displayed at the upper left position within the area P 11) among the image frames displayed in the area P 11. In response to, for instance, a depression of the cross key (not shown) included in the operation member 18, the main CPU 11 moves the cursor P 12 in the direction of the cross key operation to select an image frame. Then, in response to a "select as save candidate" instruction issued by operating the operation member 18, the main CPU 11 moves the image frame indicated by the cursor P 12 into the area Q11 so as to include the particular image frame as a save candidate. The main CPU 11 also moves the image frame with the lowest ranking among the image frames in the initial display provided in the area Q11 to the area P 11 so as to include the image frame with the lowest ranking in the batch of rejection candidate images.

It is to be noted that the image frame to be moved into the area P 11 (i.e., to be redesignated as a rejection candidate, among the image frames (save candidates) initially displayed in the area Q 11 may be selected in response to an operation performed at the operation member 18, instead. In addition, in response to the "select as save candidate" instruction, the specified image frame may be simply added to the batch of save candidate images in the area Q 11 without taking out any of the image frames (save candidates) already displayed in the area Q 11.

In response to a depression of an OK switch (not shown) included in the operation member 18, the main CPU 11 in Variation 4 ends the processing shown in the flowchart presented in FIG. 3. At the time point at which the processing in the flowchart ends, the main CPU 11 records the image frames displayed in the area Q 11 at the processing end time point into the recording medium 30. Variation 4 allows even an image frame initially rejected and included in the batch of rejection candidate images to be saved if the user wishes. In addition, since the rejection candidate images and the save candidate images are displayed in two separate areas, the user is able to distinguish them with ease.

(Variation 5)

In the embodiment described above, the value indicating the number C of images to be saved into the recording medium 30, among the N images, is set in advance through a menu operation (e.g., C=5). In Variation 5, the value for N (N>C) or the values for A and B ((A+B)>C), in addition to the value for C, can be set through a menu operation. In this case, the number of save candidate images can be set to ten instead of five, or the number of image frames captured before the time point t1 (the timing with which the full press operation signal (i.e., the photographing instruction) is input) and the number of image frames captured following the time point t1 can be set to values desired by the user.

(Variation 6)

As Variation 6, measures that may be taken when there is no difference among some evaluation values RMV calculated based upon the rejection factors and thus one image cannot be judged to be better than another. For instance, when 15 image frames are to be selected as rejection candidates from the N (=20) image frames as described earlier, the 14th through 18th image frames, counted from the image frame with the lowest evaluation value RMV (counted from the highest level of undesirability) may indicate equal evaluation values RMV. Under such circumstances, 15 rejection candidate images cannot be selected with ease simply by comparing the evaluation values RMV having been calculated based upon the rejection factors alone. In order to select the 15 rejection candidate images, two out of the five image frames, i.e., the 14th through 18th image frames counted from the image frame with the lowest evaluation value RMV calculated based upon the rejection factors, must be selected.

Accordingly, the main CPU 11 in Variation 6 selects the two image frames with the smallest values having been calculated for the evaluation value $H1(n)$, which indicates the level of proximity among a plurality of people among the various rejection factors and designates these two images as the 14th and 15th image frames to be included in the batch of rejection candidate images. In other words, when some evaluation values RMV calculated based upon the rejection factors are equal to one another and 15 rejection candidate image frames cannot be easily selected, the image frame with the smallest value having been calculated for an evaluation value (e.g., $H1(n)$) based upon a predetermined rejection factor is selected so as to ensure that the 15 least desirable image frames are selected as the rejection candidates. It is to be noted that if the values having been calculated for the evaluation value $H1(n)$ in correspondence to these images are also equal to one another and thus one image still cannot be judged to be superior to another, the image frame with the smallest value having been calculated for an evaluation value based upon yet another rejection factor, such as the evaluation value $H2(n)$ indicating the reliability of the "face" detection, should be selected.

(Variation 7)

As Variation 7, another measure that may be taken when there is no difference among some evaluation values RMV calculated based upon the rejection factors and thus one image cannot be judged to be better than another is described. For instance, when 15 image frames are to be selected as rejection candidates from the N (=20) image frames as described earlier, the 14th through 18th image frames, counted from the image frame with the lowest evaluation value RMV (counted from the highest level of undesirability) may indicate equal evaluation values RMV. The main CPU 11 in Variation 7 simply selects 13 image frames as rejection candidates without designating the image frames with equal evaluation values, none of which can be judged to be superior, i.e., the image frames including the 15th image frame, as well as those preceding and following the 15th image frame, as rejection candidate images. Namely, the main CPU adds the 14th through 18th image frames, none of which can be judged to be superior simply by comparing their evaluation values RMV having been calculated based upon rejection factors, as save candidates and thus designates seven images among i.e., the 14th through 20th image frames as save candidates.

As described above, when some evaluation values RMV calculated based upon the rejection factors are equal to one another and thus 15 image frames cannot easily be selected as rejection candidates, a smaller number of images are designated as rejection candidates (in other words, a greater number of images are designated as save candidates). However, the main CPU 11 in this variation still records the top C images (the top five images in this example) among the greater range of save candidate images into the recording medium 30 in accordance with the rankings set in step S80.

(Variation 8)

As Variation 8, a further measure that may be taken when there is no difference among some evaluation values RMV calculated based upon the rejection factors and thus one image cannot be judged to be better than another is described. For instance, when 15 image frames are to be selected as rejection candidates from the N (=20) image frames as described earlier, the 14th through 18th image frames, counted from the image frame with the lowest evaluation value RMV (counted from the highest level of undesirability) may indicate equal evaluation values RMV. The main CPU 11 in variation 8 designates all the N (=20) image frames as save candidates instead of selecting any rejection candidate image frames. It is to be noted that all the N (=20) image frames may be designated as save candidates without selecting any rejection candidates when the evaluation values RMV having been calculated for all the N (=20) image frames are less than a predetermined reference value, as well as when one image cannot be judged to be superior to others simply by comparing the evaluation values RMV having been calculated based upon the rejection factors.

The main CPU 11 in Variation 8 records the top C images (the top five images) among the 20 save candidate images, into the recording medium 30 in conformance to the rankings set in step S80.

(Variation 9)

A greater number of image frames than the C images (five images in this example) that are to be actually saved into the recording medium 30 may need to be ranked, as in Variation 7 or Variation 8 described above. In such a case, the main CPU 11 records the top C images (the top five images in this example) into the recording medium 30 in conformance to the rankings set in step S80. However, it may not be possible to judge any one image superior to another if there are no differences among their optimal image evaluation values OPT calculated based upon the keeping factors.

For instance, the third through seventh optimal image evaluation values OPT, counting from the highest optimal image evaluation value OPT having been calculated for the top ranked image, may all be equal to one another. Under such circumstances, five save candidate images cannot be easily selected simply by comparing the optimal image evaluation values OPT. However, in order to somehow select five save candidate images, three image frames among the five image frames corresponding to the third through seventh optimal image evaluation values OPT, counting from the highest optimal image evaluation value OPT having been calculated for the top ranked image based upon the keeping factors, need to be selected.

Accordingly, the main CPU 11 in Variation 9 selects the two image frames with the largest values having been calculated for the evaluation value $H7(n)$, indicating the largest "face" area among the various keeping factors, from the third through seventh image frames, and designates these two images as the fourth and fifth image frames to be saved. In other words, when some optimal image evaluation values OPT calculated based upon the keeping factors are equal to one another and 5 save candidate image frames cannot be easily selected, the image frame with the largest value having been calculated for an evaluation value (e.g., $H7(n)$) based upon a predetermined keeping factor is selected so as to ensure that the 5 most desirable image frames are selected as the recording candidates. It is to be noted that if the values having been calculated for the evaluation value $H7(n)$ in correspondence to these images are also equal to one another and thus one image still cannot be judged to be superior to another, the image frame with the largest value having been calculated for an evaluation value based upon yet another keeping factor, such as the evaluation value $H8(n)$ indicating the "face" smile factor, should be selected. If one image still cannot be deemed superior to another, the image frame with the largest value having been calculated based upon yet another keeping factor, i.e., the largest evaluation value $H9(n)$ indicating the subject size, should be selected. Likewise, if one image still cannot be deemed superior to another, the image frame with the largest value having been calculated based upon yet another keeping factor, i.e., the largest evaluation value $H10(n)$ indicating the composition optimality, should be selected. Variation 9 makes it possible to select five optimal image frames to be saved into the recording medium 30 in a reliable manner.

(Variation 10)

As variation 10, another measure that may be taken when there is no difference among some optimal image evaluation values OPT calculated based upon the keeping factors and thus one image cannot be determined to be better than another is described. If one image cannot be determined to be better than another based upon the individual evaluation values $H7(n)$ through $H10(n)$, the main CPU 11 selects five image frames to be designated as recording candidates as described below. Namely, the main CPU 11 selects as recording candidates four image frames, each scoring the highest evaluation value for one of the evaluation values $H7(n)$ through $H10(n)$ having been calculated based upon the keeping factors, from the plurality of image frames. The main CPU 11 then adds the image having been obtained (captured) with the timing closest to the timing (the time point t1) with which the full press operation signal (i.e., the photographing instruction) was input, and designates the total of five images as recording candidates. Variation 10 makes it possible to select five optimal image frames to be saved into the recording medium 30 in a reliable manner.

(Variation 11)

The present invention may be adopted in conjunction with a structure that allows other rejection factors or keeping factors to be added later. For instance, an upgrade program with at least either an additional rejection factor or an additional keeping factor incorporated therein in conjunction with a modified calculation expression may be recorded into the flash memory 16 for an update replacing the program initially stored in the flash memory 16.

In more specific terms, upon taking the upgrade program into the data storage device of the personal computer 100 shown in FIG. 9, the personal computer and the electronic camera 1 are connected via a communication cable (e.g., a USB cable) (not shown). The upgrade program may be loaded into the personal computer 100 by inserting the recording medium 104, such as a CD-ROM, with the upgrade program stored therein, at the personal computer 100, or it may be loaded into the personal computer 100 via the communication line 101 such as a network.

The upgrade program in the personal computer 100 may be transferred to the electronic camera 1 via the communication cable. The main CPU 11 records the upgrade program provided thereto into the flash memory 16 for an update. As an alternative, the personal computer 100 may first record the upgrade program into the recording medium 30, which is then inserted into the electronic camera 1 at its card interface (I/F) 17 so as to allow the main CPU 11 to read out the upgrade program recorded in the recording medium 30 and record the upgrade program thus read out into the flash memory 16 for an update. Variation 11 enables execution of evaluation processing by adopting the latest technologies based upon the upgrade program, in which additional rejection factors and keeping factors are incorporated. In addition, a rejection factor or a keeping factor favored by the user may be incorporated into the upgrade program so as to enable execution of evaluation processing customized for a particular user.

The above described embodiment and variations are examples and various modifications can be made without departing from the scope of the invention.

What is claimed is:

1. An image processing device, comprising:
 a first arithmetic operation unit that individually calculates an evaluation value of each of a plurality of images included in an image batch input thereto based upon first factors;
 an exclusion unit that executes exclusion processing based upon calculation results provided by the first arithmetic operation unit so as to exclude at least one image, the calculation results for which satisfy a predetermined condition, from the image batch;
 a second arithmetic operation unit that calculates an evaluation value of each image of the plurality of images not excluded from the image batch by the exclusion unit based upon second factors, which include a factor different from the first factors; and
 an evaluation processing unit that ranks the images not excluded from the image batch by the exclusion unit based upon calculation results provided by the second arithmetic operation unit.

2. An image processing device according to claim 1, wherein:
 the plurality of images included in the image batch are obtained through a continuous shooting operation.

3. An image processing device according to claim 1, wherein:
 the first arithmetic operation unit alters contents of the first factors in correspondence to a photographic scene when capturing the image batch.

4. An image processing device according to claim 3, wherein:
 the first arithmetic operation unit alters the contents of the first factors in correspondence to at least either whether or not the image batch includes a dynamic subject image or whether or not there is a person in a subject image.

5. An image processing device according to claim 1, wherein:
 the exclusion unit excludes at least half of the images in the image batch based upon the calculation results provided by the first arithmetic operation unit.

6. An image processing device according to claim 1, wherein:
 some of the first factors and some of the second factors overlap.

7. An image processing device according to claim 6, wherein:
 the overlapping factors include at least either sharpness information in a predetermined area of each of the images making up the image batch or luminance distribution information over an entire range of each of the images making up the image batch.

8. An image processing device according to claim 1, wherein:
 the second factors include at least one of a factor related to a facial expression on a person captured in a subject image included in the image batch, a factor related to an areal size of a face of a person and a factor related to blurring manifesting in the subject image.

9. An image processing device according to claim 1, further comprising:
 a display control unit that displays on a display device images to be excluded by the exclusion unit.

10. An image processing device according to claim 9, further comprising:
 a control unit that controls the exclusion unit so as not to exclude a specific image among the images displayed on the display device by the display control unit.

11. An image processing device according to claim 1, further comprising:
 a factor adding unit that adds a new factor to at least either the first factors or the second factors.

12. An image processing device according to claim 5, wherein:
 the exclusion unit excludes a predetermined number of images from the image batch; and
 the predetermined number can be altered.

13. An image processing device according to claim 12, wherein:
 the exclusion unit does not execute the exclusion processing if the predetermined number of images cannot be excluded based upon the calculation results provided by the first arithmetic operation unit;
 when the exclusion unit does not execute the exclusion processing, the second arithmetic operation unit calculates the evaluation value of each image of all the plurality of images in the image batch having been input based upon the second factors; and
 the evaluation processing unit ranks the images in the entire image batch having been input based upon the calculation results provided by the second arithmetic operation unit.

14. An image processing device according to claim 12, wherein:
 the exclusion unit excludes a second predetermined number of images, fewer than the predetermined number of images, from the image batch if the predetermined number of images cannot be excluded based upon the calculation results provided by the first arithmetic operation unit;
 when the second predetermined number of images have been excluded by the exclusion unit, the second arithmetic operation unit calculates the evaluation value of each image of the plurality of images not excluded from the image batch by the exclusion unit based upon the second factors; and
 the evaluation processing unit ranks the images not excluded from the image batch by the exclusion unit based upon the calculation results provided by the second arithmetic operation unit.

15. An image processing device according to claim 13, further comprising:
a selection unit that selects save-target images based upon rankings having been set by the evaluation processing unit.

16. An image processing device according to claim 15, wherein:
if there is no difference between the rankings, the selection unit selects an image having been obtained with timing closest to a timing with which a photographing instruction has been issued and an image with a largest evaluation value having been calculated based upon the second factors.

17. A non-transitory computer-program product that includes an image evaluation program, the image evaluation program comprising:
first processing through which an image batch made up with a plurality of images is input;
second processing through which an evaluation value of each of the plurality of images included in the image batch is calculated based upon first factors;
third processing through which exclusion processing is executed to exclude at least one image, in which calculation results provided through the second processing satisfy a predetermined condition, from the image batch;
fourth processing through which an evaluation value of each image of the plurality of images not excluded from the image batch through the third processing is calculated based upon second factors that include a factor different from the first factors; and
fifth processing through which the images not excluded through the third processing are ranked based upon calculation results obtained through the fourth processing.

18. A computer-program product according to claim 17, wherein:
the plurality of images included in the image batch are obtained through a continuous shooting operation.

19. A computer-program product according to claim 17, wherein:
the second processing is executed by altering contents of the first factors in correspondence to a photographic scene when capturing the image batch.

20. A computer-program product according to claim 19, wherein:
the contents of the first factors used in the second processing are altered in correspondence tout least either whether or not the image batch includes a dynamic subject image or whether or not a person is present in the subject image.

21. A computer-program product according to claim 17, wherein:
some of the first factors and some of the second factors overlap.

22. A computer-program product according to claim 21, wherein:
the overlapping factors include at least either sharpness information in a predetermined area of each of the images making up the image batch or luminance distribution information over an entire range of each image of the images making up the image batch.

23. A computer-program product according to claim 17, wherein:
the second factors include at least one of a factor related to a facial expression on a person captured in a subject image included in the image batch, a factor related to an areal size of a face of a person and a factor related to blurring manifesting in the subject image.

24. A computer-program product according to claim 17, the image evaluation program further comprising:
sixth processing through which images to be excluded through the third processing are displayed on a display device.

25. A computer-program product according to claim 24, wherein:
a specific image among the images displayed on the display device through the sixth processing is not excluded in the third processing.

26. A computer-program product according to claim 17, wherein:
a predetermined number of images are excluded from the image batch in the third processing based upon the calculation results obtained through the second processing; and
the predetermined number can be altered.

27. A computer-program product according to claim 26, wherein:
the exclusion processing is not executed in the third processing if the predetermined number of images cannot be excluded based upon the calculation results obtained through the second processing;
when the exclusion processing is not executed in the third processing, the evaluation value of each image of the entire plurality of images in the image batch having been input through the first processing is individually calculated in the fourth processing based upon the second factors; and
in the fifth processing, all the images in the entire image batch having been input are ranked based upon the calculation results obtained through the fourth processing.

28. A computer-program product according to claim 26, wherein:
in the third processing, a second predetermined number of images, fewer than the predetermined number of images, are excluded from the image batch if the predetermined number of images cannot be excluded based upon the calculation results obtained through the second processing;
in the fourth processing, when the second predetermined number of images have been excluded through the third processing, the evaluation value of each image of the plurality of images not excluded from the image batch through the third processing is calculated based upon the second factors; and
in the fifth processing, the images not excluded through the third processing are ranked based upon the calculation results obtained through the fourth processing.

29. A computer-program product according to claim 27, the image evaluation program further comprising:
seventh processing through which save-target images are selected based upon rankings having been set through the fifth processing.

30. A computer-program product according to claim 29, wherein:
in the seventh processing, if there is no difference between the rankings, an image having been obtained with timing closest to a timing with which a photographing instruction has been issued and an image with a largest evaluation value having been calculated based upon the second factors are selected.

31. An image processing device, comprising:
a computer capable of executing the image evaluation program of the computer-program product according to claim 17, wherein:
the image batch is input from a recording medium having recorded therein a plurality of images; and
the processing is executed.

32. An image processing device according to claim 1, further comprising:
a decision unit that makes a decision as to whether or not a person's face is included in each of the plurality of images included in the input image batch, wherein:
the first arithmetic operation unit calculates an evaluation value of each image that the decision unit has decided that a person's face is included;
the first factors include a factor with regard to eye closure detection; and
the second factors include a factor with regard to smile detection.

33. An image processing device according to claim 1, wherein:
the first arithmetic operation unit alters contents of the first factors in correspondence to a photographic scene when capturing the image batch; and
the second arithmetic operation unit alters contents of the second factors in correspondence to a photographic scene when capturing the image batch.

* * * * *